E. A. ASHCROFT.
PRODUCTION OF MAGNESIUM OR ALLOYS OF MAGNESIUM AND BY-PRODUCTS.
APPLICATION FILED AUG. 12, 1919.
1,359,654. Patented Nov. 23, 1920.
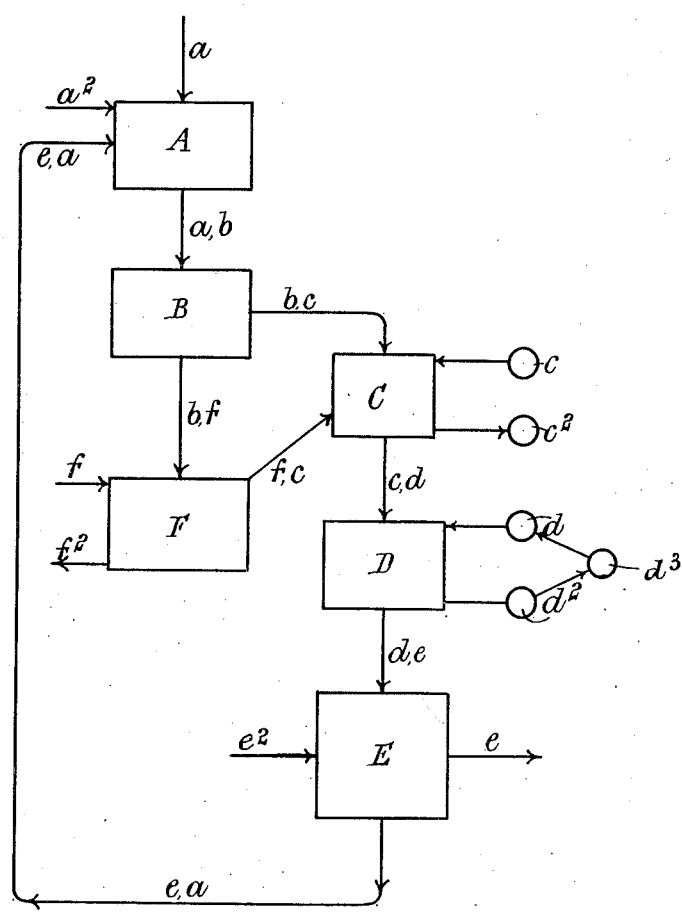
INVENTOR
Edgar Arthur Ashcroft
By Johnson and Johnson
Attorneys

UNITED STATES PATENT OFFICE.

EDGAR ARTHUR ASHCROFT, OF LONDON, ENGLAND.

PRODUCTION OF MAGNESIUM OR ALLOYS OF MAGNESIUM AND BY-PRODUCTS.

1,359,654. Specification of Letters Patent. Patented Nov. 23, 1920.

Application filed August 12, 1919. Serial No. 317,084.

*To all whom it may concern:*

Be it known that I, EDGAR ARTHUR ASHCROFT, a subject of the King of Great Britain, residing at 65 London Wall, in the city of London, England, have invented new and useful Improvements in the Production of Magnesium or Alloys of Magnesium and By-Products, of which the following is a specification.

My invention has for its object to provide a cyclic, combined, or continuous, process for the production of magnesium, or alloys of magnesium, and magnesium chlorate, (or by products therefrom) simultaneously, whereby the materials employed are utilized, or recovered, and the resulting products obtained with facility and economy at low cost and with maximum yield, and consequently with great manufacturing advantages.

According to my invention I take hydrated magnesium chlorid, which can be obtained, for instance, from solutions thereof, and I dry, or dehydrate, it, in such manner as to convert it into anhydrous magnesium chlorid and then I electrolyze it in any suitable manner so that metal magnesium, (or an alloy thereof, with lead, zinc, or other heavy metal) and chlorin gas are produced, the chlorin gas being conducted to an absorber of any suitable kind in which circulates an emulsion of magnesium oxid (such for example as an emulsion of lightly calcined magnesite in water) so that the magnesium oxid is decomposed and hydrated magnesium chlorid and magnesium chlorate are simultaneously formed. The magnesium chlorate can be converted into any required chlorate; such, for instance, as potassium chlorate, by double decomposition with the corresponding chlorid and the products can be separated and recovered by crystallization, or in any other known, or suitable manner. Hydrated magnesium chlorid is crystallized out from the solutions, or mother liquors, and is dried or dehydrated and used again in the process thus completing the cycle according to this invention.

I do not limit myself to precise details in carrying out the several steps of my hereinbefore explained cyclic, combined, or continuous, process, but it can be performed efficiently as follows:—

I take hydrated magnesium chlorid obtained, by crystallization, from a solution thereof (preferably in the form of needle crystals) and I convert it into anhydrous magnesium chlorid by subjecting it to the drying, or dehydrating, process described under my application Ser. No. 317,082 for Letters Patent of even date herewith.

The anhydrous magnesium chlorid thus obtained is electrolyzed according to the process and by means of the apparatus described under my application Ser. No. 317,083 for Letters Patent of even date herewith, only one cell of the double cell apparatus therein described being employed when I desire to make metallic alloys of magnesium the magnesium produced by the decomposition of the magnesium chlorid being alloyed with a heavier metal placed at the bottom of the cell and the said alloy being from time to time removed and fresh heavy metal added.

The chlorin gas from the electrolytic apparatus is conducted into an absorber wherein it is brought into contact with lightly calcined magnesite in emulsion in water, such absorber preferably consisting of a stone-ware tower packed with any suitable material and terminating in a conical base dipping deeply into a sump, or well, into which the emulsion passing through the tower is received and from which it is pumped to the top of the tower in continuous circulation. The magnesium oxid is thereby decomposed and magnesium chlorate (one molecular proportion) and magnesium chlorid (five molecular proportions), simultaneously formed.

The magnesium chlorate can be converted, in any suitable way, into any other chlorate which may be desired, for example, it can be converted into potassium chlorate by the addition to the solution of a quantitative proportion of potassium chlorid, or the magnesium chlorate, or the mixture of chlorid and chlorate may be employed usefully, as an oxidizing, chlorinating, or dehydrating, agent in many organic processes, or in the reproduction of chlorin gas, or chlorin oxids by the aid of hydrochloric acid. The remaining magnesium chlorid is used again in the cyclic process so that nothing is lost.

A proportion of the hydrated magnesium chlorid is crystallized out from the solutions or mother liquors, as aforesaid, at each cycle and dried, or dehydrated, and electrolyzed again in the recurring continuation of the cycle of operations as hereinbefore explained. The potassium chlorid (if that has been produced) is also crystallized out from the mother liquors and the remaining liquors are returned to the circulation, or cycle, of the process.

The diagram accompanying my provisional specification illustrates my cyclic process in connection with an arrangement or plant, for carrying it out. A represents the absorbing apparatus, or tower, wherein is circulated an emulsion of magnesium oxid in water. The arrow $a$ represents the supply of calcined magnesite and the arrow $a^2$ represents the supply of water, while the arrow $e\,a$ represents the supply of returning chlorin gas obtained from the electrolytic apparatus E. The arrow $a\,b$ represents the finished solution containing both magnesium chlorid and magnesium chlorate, which is passed to the first crystallizing apparatus B. The arrow $b\,f$ represents the partially depleted solution passing to the second crystallizing apparatus F, wherein it is treated with a solution of potassium chlorid the charging of which into the apparatus is represented by the arrow $f$. The arrow $f^2$ represents the output of potassium chlorate obtained, while the arrows $b\,c$ and $f\,c$ represent the crystallized magnesium chlorid which is conveyed to the air-drying apparatus C. The circle $c$ represents the blower which passes heated air to the air-drier C, and the circle $c^2$ represents the washing apparatus wherein the air, after passing through the air-drier C, is washed for the recovery of any hydrochloric acid contained therein. The arrow $c\,d$ represents the passage of the partially dried chlorids from the air-drier C to the hydrochloric acid drying apparatus D, the circle $d$ representing the hydrochloric acid gas generator, the circle $d^2$ representing the absorber for the production of hydrochloric acid solution, and the circle $d^3$ representing the concentrator for the sulfuric acid which is employed to liberate the dried hydrochloric acid gas from the solution. The arrow $d\,e$ represents the passage of the dehydrated and finished crystals to the electrolytic apparatus E while the arrow $e$ represents the output of metallic magnesium, or of magnesium alloy, as the case may be. The arrow $e^2$ represents the supply of heavy metal to the electrolytic apparatus E if a magnesium alloy is to be produced.

The cycle is thus complete and quantitative.

In the following claims the word "magnesium" is intended to include that metal either by itself, or alloyed with a heavy metal, such as lead, or zinc.

I claim—

1. A process for the production of magnesium and by-products which comprises dehydrating hydrated magnesium chlorid, then electrolyzing the resulting anhydrous magnesium chlorid, thereby producing magnesium and chlorin gas, absorbing the said chlorin gas in magnesium oxid emulsion and thus producing magnesium chlorate and hydrated magnesium chlorid and separating these and employing the magnesium chlorid again in the process.

2. A process for the production of magnesium and by-products which comprises dehydrating hydrated magnesium chlorid, then electrolyzing the resulting anhydrous magnesium chlorid, thereby producing magnesium and chlorin gas, absorbing the said chlorin gas in magnesium oxid emulsion and thus producing magnesium chlorate and hydrated magnesium chlorid in solution, converting the said magnesium chlorate into another chlorate, separating the products and passing back the hydrated magnesium chlorid for use again in the process.

3. A process for the production of magnesium and by-products which comprises dehydrating hydrated magnesium chlorid, then electrolyzing the resulting anhydrous magnesium chlorid, thereby producing magnesium and chlorin gas, absorbing the said chlorin gas in magnesium oxid emulsion and thus producing magnesium chlorate and hydrated magnesium chlorid, subjecting the chlorate to chemical reaction, which will remove its oxygen, and passing the remaining hydrated magnesium chlorid back again for reuse in the process.

In testimony whereof I have signed my name to this specification in the presence of two subscribing witnesses.

EDGAR ARTHUR ASHCROFT.

Witnesses:
 G. F. Lyons,
 L. Walter.